Jan. 17, 1933.  E. J. RANTSCH  1,894,921
SEAL PRESS
Filed June 25, 1932
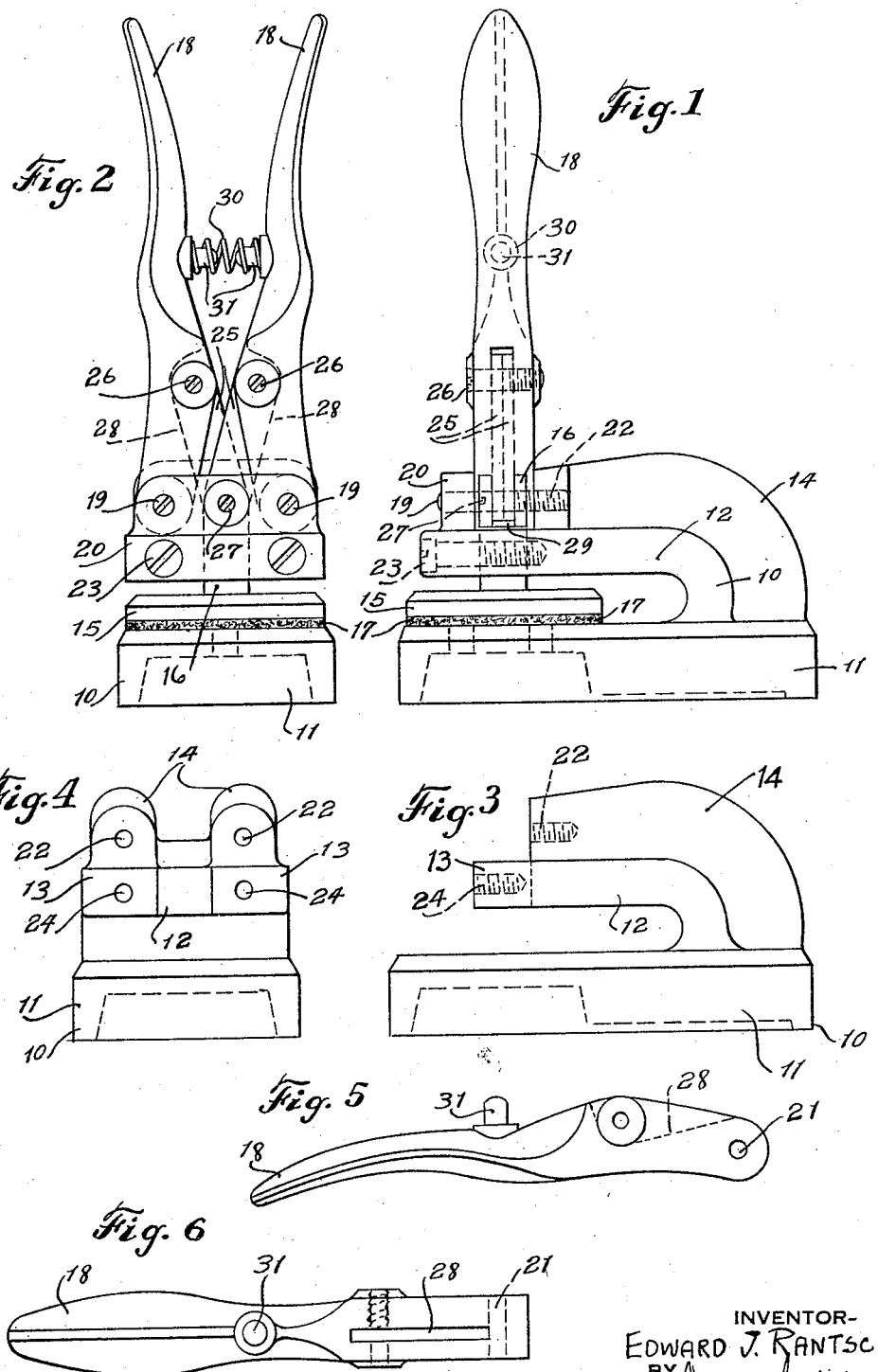
INVENTOR-
EDWARD J. RANTSCH
BY
ATTORNEY- Patented Jan. 17, 1933

1,894,921

UNITED STATES PATENT OFFICE

EDWARD J. RANTSCH, OF HOLLIS, NEW YORK, ASSIGNOR TO HILL-INDEPENDENT MANUFACTURING COMPANY, OF GERMANTOWN, PENNSYLVANIA

SEAL PRESS

Application filed June 25, 1932. Serial No. 619,171.

This invention relates to new and useful improvements in a seal press.

The invention has for an object the construction of a seal press which is characterized by the provision of a pair of handles pivotally connected upon a frame, and a pair of links pivotally connected with said handles and with the stem of a jaw, in a manner so that when the handles are pressed together, the jaw will be caused to move under a mechanical advantage.

As a still further object of this invention it is proposed to construct the frame of substantially U-shape and turn it upon one side so that one arm constitutes the bottom arm, and further to form the frame with a pair of projections from the top arm, and to provide a holding block secured across the projections in a manner so as to securely hold the stem of the jaw slidably in place and further supplement the holding of the handles as called for in a previous paragraph.

A still further object of the invention is the provision of means whereby the handles are normally urged apart from each other so that they may be pressed together for operation.

Another one of the objects of this invention is the construction of each of the handles in a manner so as to have formed upon one of the sides, a slot recess adapted to receive a portion of the link previously mentioned as hereinafter further described. Furthermore, it is proposed to construct the handles in a manner so that the same handle may be used either on the right or left side, eliminating the necessity of two different right and left handles.

Furthermore, it is proposed to reinforce the U-shaped frame with longitudinal ribs along the top and rear, and to accomplish the pivotal mounting of the handles upon the frame by pivotally securing them on the ends of said ribs.

Another one of the objects of this invention is the construction of an article as mentioned which is simple, silent and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a seal press constructed according to this invention.

Fig. 2 is an end elevational view of Fig. 1.

Fig. 3 is a side elevational view of the frame used in the device.

Fig. 4 is an end elevational view of Fig. 3.

Fig. 5 is a side elevational view of one of the handles used in the device, and

Fig. 6 is a front elevational view of Fig. 5.

The seal press according to this invention is composed of a substantially U-shaped frame 10 turned upon one of its sides so that one arm, indicated by reference numeral 11, constitutes the bottom thereof and the other arm 12 the top thereof. The top arm 12 is shorter than the bottom arm 11 and is formed at its free end with a pair of spaced projections 13. A pair of parallel spaced ribs 14 extend across the top arm and down along the bent portion to the bottom arm and serve to reinforce the frame to make it absolutely rigid and sturdy.

A jaw 15 is disposed between the arms of the frame and has a stem portion 16 extending up between the projections 13. Seal elements 17 are secured on opposite faces of the bottom arm 11 of the U-shaped frame and the jaw 15.

A pair of handles 18 are pivotally mounted at their lower ends upon the ends of the ribs 14. This pivotal mounting is accomplished by screws 19 engaging through the holding block 20 extended across the spaced projections 13. The screws 19 engage through the holding block 20 and through apertures 21 formed in the bottoms of the handles 18 and into threaded openings 22 formed in the ends of the ribs 14. Other screws 23 engage through the holding block 20 and into threaded apertures 24 formed in the projections 13 so as to securely hold the stem 16 of the jaw 15 in a sliding position in which the jaw cannot be accidentally displaced.

A pair of links 25 are pivotally connected at their top ends intermediate of the ends of the handles 18, and at their bottom ends upon the stem 16. These links are adjacent each other and in contact as clearly shown in Fig. 1. Each of the handles 18 is formed with a recessed slot 28 extending in from one of the sides so that the links may partially engage therein, and allow for the passage of screws 26 to accomplish the pivotal connecting of the links and the handles. The stem 16 is formed with a slot 29 to accommodate the lower ends of the links 25 and a screw 27 engages through the stem and the links to accomplish the pivotal connecting of these parts.

Resilient means is provided for normally urging the handles 18 apart so as to cause the jaw 15 to assume a raised position. This means comprises an expansion spring 30 acting between projecting pegs 31 upon the adjacent faces of the handles 18. The handles 18 are so formed that the portions below the pivot points 26 diverge from each other, and the portions above these points also diverge. The arrangement of the lower diverging portions causes the screws 26 to be located within vertical planes through the screws 19 and consequently the portions are at all times in proper position to exert a maximum of pressure due to mechanical advantage when the handles 18 are pressed together.

The arrangement of having both of the handles movable towards each other for the operation of the seal press is of advantage in that it is only necessary to apply half of the necessary force upon each of the handles so that the sum total is sufficient to cause proper impressing of the seal upon paper and other material disposed between the sealing elements 17. When the handles 18 are pressed together the points at the screws 26 will swing towards each other around the screws 19 as pivots and consequently the lower ends of the links 25 will move downwards and so move the jaw 15 downwards to accomplish the impressing. When the handles are released after being pressed together they will open under the action of spring 30 silently, that is, without a click as is customary when cam actions are used.

While I have illustrated and described my invention with some degree of particularity, I realize that in practice various alterations therein may be made. I therefor reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A seal press, comprising a frame of substantially U-shaped and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, and a pair of links pivotally connected upon the top of said stem and at their top ends of said handles.

2. A seal press, comprising a frame of substantially U-shape and turned upon one side so that one arm constitutes the bottom, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, and a pair of links pivotally connected upon the top of said stem and at their top ends selectively pivotally connected intermediate the ends of said handles.

3. A seal press comprising a frame of substantially U-shape and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, and a pair of links pivotally connected upon the top of said stem and at their top ends selectively pivotally connected intermediate the ends of said handles, a pair of laterally spaced ribs being formed upon said top arm and the securing of said handles upon the top arm being accomplished by securing said handles upon the free ends of said ribs.

4. A seal press, comprising a frame of substantially U-shape and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, a pair of links pivotally connected upon the top of said stem and at their top ends selectively pivotally connected intermediate the ends of said handles, and a holding block secured across said projections to slidably hold said stem.

5. A seal press, comprising a frame of substantially U-shape and turned upon side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, a pair of links pivotally connected upon the top of said stem and at their top ends selectively pivotally connected intermediate the ends of said handles, a holding block secured across said projections to slidably hold said stem, and screws engaging through said holding block and through the bottom ends of said handles and into the ribs upon said top arm to accomplish the pivotal connecting of the handles with said top arm.

6. A seal press, comprising a frame of substantially U-shape and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, a pair of links pivotally connected upon the top of said stem and at their top ends selectively pivotally connected intermediate the ends of said handles, a holding block secured across said projections to slidably hold said stem, and screws engaging through said holding block and through the bottom ends of said handles and into the ribs upon said top arm to accomplish the pivotal connecting of the handles with said top arm, said holding block being detachable.

7. A seal press, comprising a frame of substantially U-shape and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, a pair of links pivotally connected upon the top of said stem and at their top ends selectively pivotally connected intermediate the ends of said handles, and resilient means urging the tops of the handles apart.

8. A seal press, comprising a frame of substantially U-shape and turned upon one side so that one arm constitutes the bottom, the top arm being shorter than the bottom arm, the top arm of said frame being formed on the free end with laterally spaced projections, a jaw between the arm of said frame and having a stem extending between said projections, seal elements on opposite faces of said jaw and bottom arm, a pair of handles pivotally connected at their lower ends upon the end of said top arm, a pair of links pivotally connected upon the top of said stem and at their top ends selectively pivotally connected intermediate the ends of said handles, said handles being formed with recessed slots on opposing faces said links being partially engaged into these slots, and pintle screws engaging through the hand and the links to accomplish the pivotal connecting of these parts.

9. A seal press, comprising a frame of substantially U-shape and turned upon one side so that one arm constitutes the bottom, the top arm being shorter than the bottom arm, the top arm of said frame being formed on the free end with laterally spaced projections, a jaw between the arms of said frame and having a stem extending between said projections, seal elements on opposite faces of said jaw and bottom arm, a pair of handles pivotally connected at their lower ends upon the end of said top arm, and a pair of links pivotally connected upon the top of said stem and at their top ends selectively pivotally connected intermediate the ends of said handles, said handles being formed with recessed slots on opposing faces, said links being partially engaged into these slots, and pintle screws engaging through the hand and the links to accomplish the pivotal connecting of these parts, the lower ends of said links being engaged into a slot formed in said stem, and a pivotal screw engaging through the stem and links to pivotally connection of these parts.

In testimony whereof I affix my signature.
EDWARD J. RANTSCH.